Nov. 28, 1950  L. W. WATERS  2,531,927
MACHINE FOR HALVING AND PITTING DRUPACEOUS FRUIT
Filed Feb. 6, 1945  5 Sheets-Sheet 1
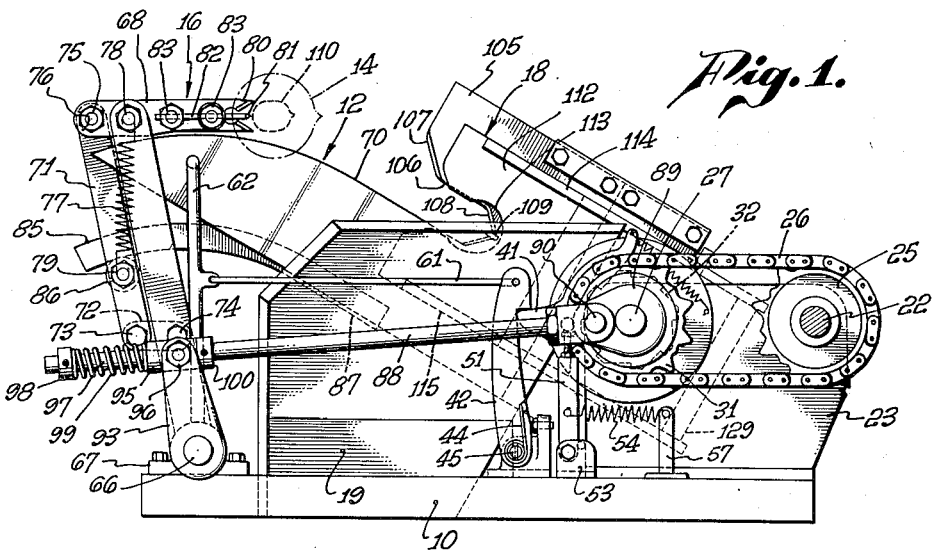
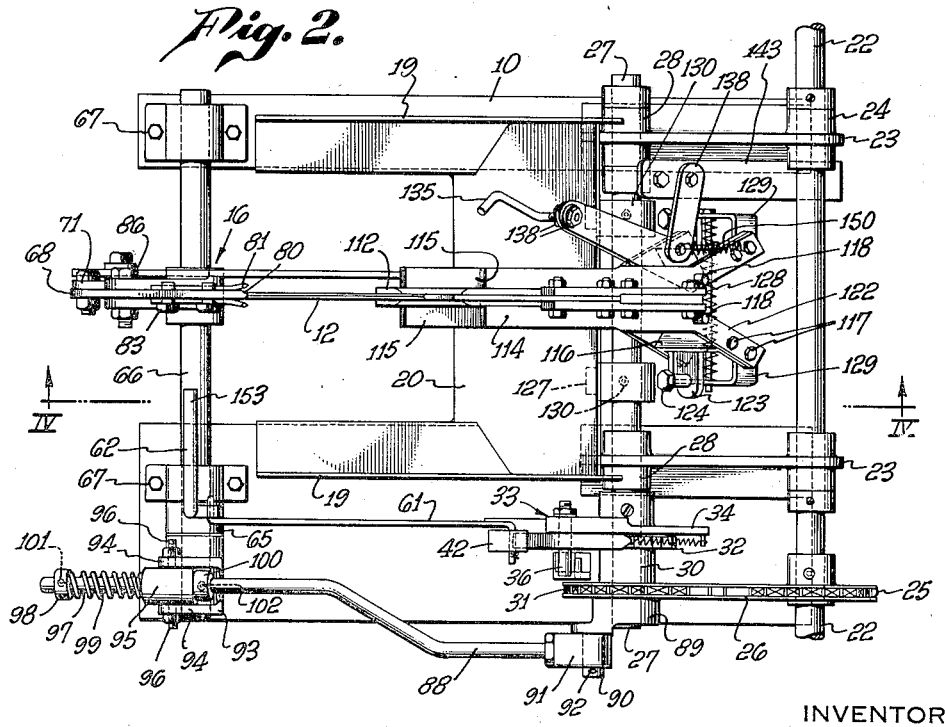
INVENTOR,
Lawrence W. Waters.
BY
ATTORNEY.

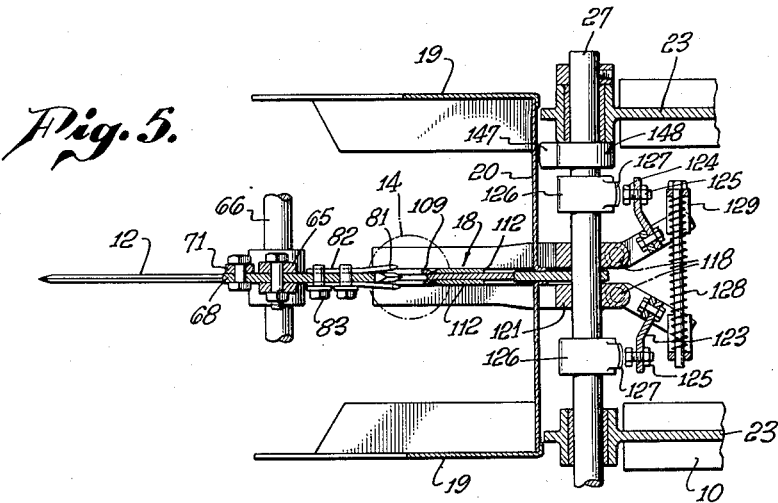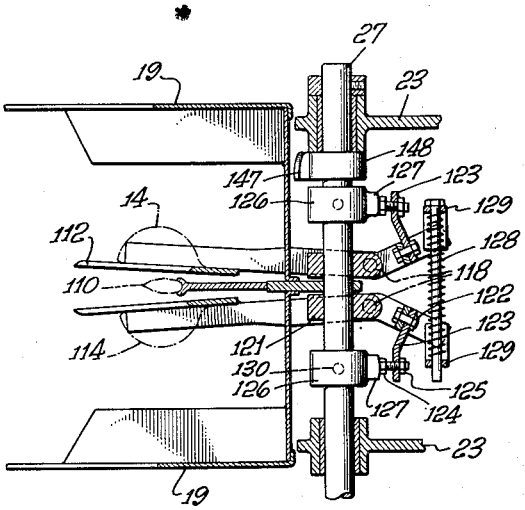

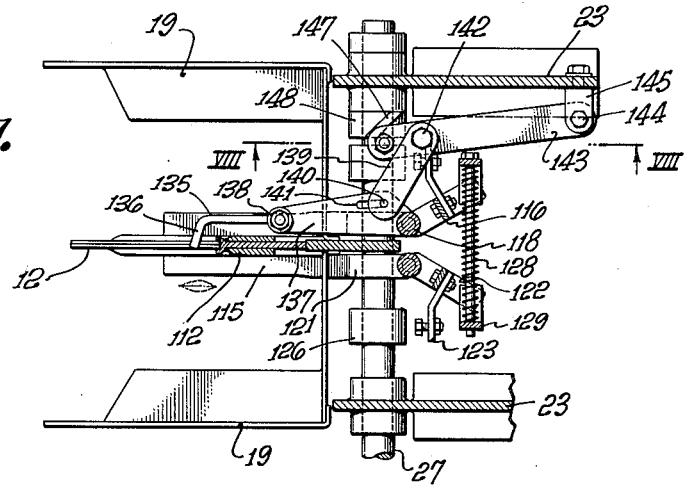

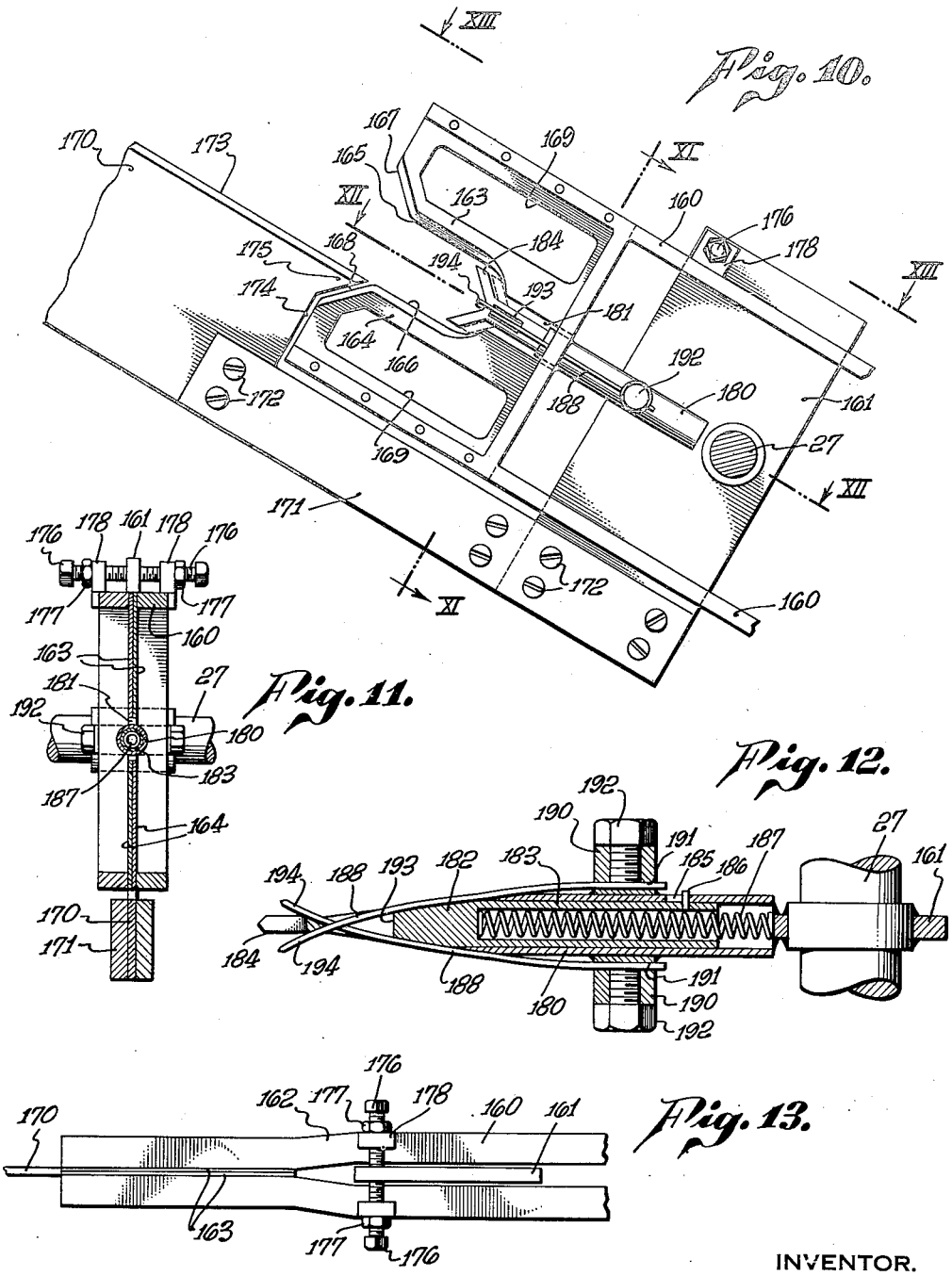

Patented Nov. 28, 1950

2,531,927

UNITED STATES PATENT OFFICE 2,531,927

MACHINE FOR HALVING AND PITTING DRUPACEOUS FRUIT

Laurence W. Waters, Ontario, Calif., assignor to Benton Ballou Company, Ltd., Ontario, Calif., a corporation of California Application February 6, 1945, Serial No. 576,467

8 Claims. (Cl. 146—28)

This invention relates to canning machinery and has particular reference to a machine which is capable of cutting and separating drupaceous fruits into halves and at the same time separating the pit or stone from both halves, so that the meat of the fruit can be collected and handled entirely free from the pit.

In the preparation of fruit for canning and particularly drupaceous fruits, which include peaches, cherries and the like, it is necessary to cut the fruit into halves without shredding or tearing the meat and to remove the pit from each of the halves without undue loss of meat or flesh. These operations must be carried out rapidly and effectively, since even a single pit in a large batch of canned, pitted fruit gives rise to much unfavorable comment. It therefore becomes highly desirable to provide a pitting machine which will operate to such a degree of accuracy and efficiency that it will mechanically grip the pit or stone until the halves of the meat have been torn from it and thereafter reject the pit by itself. Moreover, since unskilled help is employed and great quantities of fruit must be handled, the machine must be rugged, fool-proof, easily serviced, and easily operated.

The machine of this invention is adapted particularly to the pitting of fruits classed as freestone, wherein the pit adheres to the meat with relatively light tenacity, as contrasted with the so-called clingstone fruits, of which peaches are a notable example.

It is therefore among the objects of the invention to provide a new and improved pitter for drupaceous fruits which is adapted to retain the pit while the meat is separated from it and thereafter reject the pit.

Another object of the invention is to provide a machine for pitting drupaceous fruits which is adapted to accommodate fruits of different size without readjustment and particularly fruits of the same kind wherein the size of the pit might be different, so that during operation of the machine a pit-gripping portion will be advanced until such time as it actually comes into contact with the pit before the advance is stopped and which is further so equipped that the meat of the fruit will not be pulled from the pit until the pit has been properly grasped.

Still another object of the invention is to provide a machine for pitting fruits wherein the portion of the machine which is designed to grasp the pit is permitted some degree of mechanical adjustment to accommodate extremely wide variations in the type of pit, particularly where the machine may be used for small fruits such as cherries at one time and later for large fruits, such as peaches.

A further object of the invention is to provide a one-revolution type of machine for pitting fruits which is so set up that it will remain inoperative until a fruit has been set on an empaler after which by a convenient means the machine is set in operation and continues through one complete cycle only, after which it comes to a stop until again being manually released.

A further object still is to provide a fruit-pitting machine which takes advantage of the positioning of the meat of the fruit on either side of a stationary slide so that the slide forms a guide for the fruit as it is advanced to the end of the slide where the pit is separated from the meat, thereby enabling the fruit to be accurately positioned as it enters the operative end of the machine.

Another object is to provide in a fruit pitting machine a sliding bar having a sharp edge on one side for initially positioning the fruit so that an initial cut is made along one side, thereby rendering it unnecessary to move the fruit in any more than one direction in order to effect a cut on the sides of the fruit remote from the side cut by placing it in its initial position.

With these and other objects in view, the invention consists in the construction, arrangement and combination of the various parts of the device whereby the objects contemplated are attained, as hereinafter more fully set forth, pointed out in the claims and illustrated in the accompanying drawings, in which:

Fig. 1 is a side elevational view of the device showing a peach on an empaler at its initial position.

Fig. 2 is a plan view of the device with the empaler in its initial position.

Fig. 5 is a horizontal, sectional view taken on the line V—V of Fig. 4 showing the empaler in advanced position.

Fig. 6 is a view similar to Fig. 5 showing meat-separating elements in operative position wherein the meat is torn from the pit.

Fig. 7 is a substantially horizontal, sectional view taken on the line VII—VII of Fig. 4 showing a pit knock-out bar in operative position.

Fig. 8 is a detailed view of a cam action for the pit knock-out bar taken on the line VIII—VIII of Fig. 7.

Fig. 9 shows a battery of machines designed to be operated from a single drive shaft and equipped with a single conveyor belt for all of the machines.

Fig. 10 is a side elevational view of a portion of the device showing a modified structure of the fruit-separating and pit-receiving members.

Fig. 11 is a sectional view of the device taken on the line XI—XI of Fig. 10.

Fig. 12 is a cross-sectional view taken on the line XII—XII of Fig. 10 showing the pit-engaging member in an extended position.

Fig. 13 is a plan view of the device shown in Fig. 10 taken on line XIII—XIII.

Figure 3:
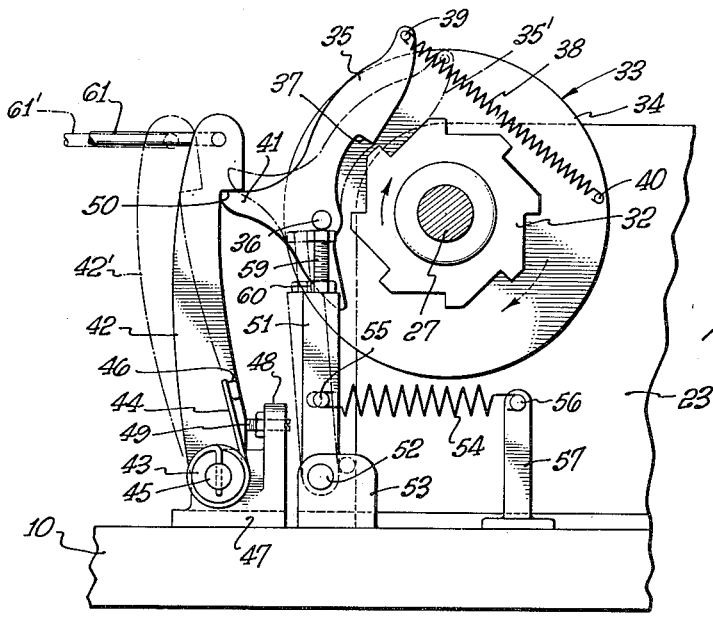
Fig. 3 is a fragmentary, side view drawn to a larger scale showing a single-revolution clutch mechanism.

In the design and construction of machines which are to handle fresh fruit in the canning industry, various factors must be taken carefully into consideration. In the first place, these machines are customarily operated by relatively inexperienced help and therefore must be made as simple to operate as is commensurate with the type of performance required. Also these machines, when placed into operation during the canning season, must be expected to perform continuously and uninterruptedly for several months at a time until the season is over. They must therefore be made rugged as well as accurate to minimize servicing problems during the period of operation.

Also, because of the presence of various fruit acids in the fruits operated upon which remain present in the machine during most of the canning season, it is highly desirable to minimize the number of moving and operating parts which may actually come into contact with the fruit or fruit juices and consequently there is presented the problem of placing necessary operative parts in a position remote from the fruit without sacrificing the necessity of preserving simplicity and ruggedness in the design.

By reason of the fact also that these machines are used by inexperienced help, they must be so constructed that they are safe to operate and so that there will be no power-operated cutting parts which are apt to trap the fingers of an operator and cause serious injury during the course of operation.

Various types of machines have been employed in the past, some of them capable of splitting fruit so that the pit might lie in one half only, but machines of this kind necessitate a further operation upon the fruit in order that the pit may be separated from one half or the other. More recently, certain types of machines have been designed for separating the meat from the pit, as for example, by the use of wires which hug the pit as they are drawn through the fruit and thereby separate the meat from the pit. Devices of this kind, however, have been relatively complicated and expensive to manufacture, so that there has remained a field for a simple and inexpensive machine which can be used particularly upon the freestone type of fruits.

To accomplish the desired results, there has been provided a relatively simple machine illustrated as to a considerable number of its working parts in Fig. 1 of the drawings. In general, the machine consists of a base 10 upon which is mounted a stationary blade 12 for cutting and guiding a fruit 14, such as a peach, which is designed to be initially held in place by means of a fruit empaler 16. Suitable mechanism is provided connected to a source of power by means of which the fruit may be slid along the slide 12 from the initial position shown in Fig. 1 to a final position best illustrated in Fig. 5 wherein the peach has been advanced to the opposite end of the slide, meanwhile effecting a cut in the fruit so as to separate it into halves and thereafter permitting the halves to be separated from the pit and the pit subsequently knocked from the position in which it is retained during separation of the meat.

It will be apparent from an examination of Figs. 1 and 5 that a pair of jaws 18 on each side of the slide are designed to be separated and moved mechanically outwardly as best seen in Fig. 6, thereby tearing the meat from the pit. After the meat has been torn from the pit it falls into a bin defined in part by the deflecting sides 19 and the end 20 which guide it downwardly to a conveyor belt 21 which collects the meat and pit together, taking them to some distant point at which the pits are separated from the meat.

Power for operating the device may be supplied by a drive shaft 22 which can extend through several machines in a single battery. The drive shaft is supported by means of a frame comprising vertical supports 23 mounted upon the base 10 and which are equipped with bearings 24 in which the drive shaft is journaled.

In order to simplify the description of the machine, only one machine of the battery shown in Fig. 9 will be described in detail. This machine is shown in detail in the drawings and the general setup can best be viewed in Fig. 1.

As there shown the drive shaft 22 is provided with a sprocket 25 around which extends a drive chain 26. Spaced from and parallel to the drive shaft is an operating shaft 27 upon which is mounted certain operative parts of the machine together with a single-revolution clutch by means of which the drive shaft can be connected to the operating shaft whenever it is desired to operate the device. As shown in the drawings, the operating shaft is supported by the same supports 23 upon which the drive shaft is mounted, the operating shaft being journaled within similar bushings 28.

Adjacent one end of the operating shaft, which in Fig. 2 of the drawings is the lower end, is positioned a sleeve 30 freely rotatable about the operating shaft. The sleeve is provided with a sprocket 31 having teeth designed to mesh with the chain 26 and be driven thereby. Secured to and rotatable with the sleeve 30 and sprocket 31 is a ratchet gear 32 best shown in Fig. 3. So long as the drive shaft is operated, the chain 26 will rotate the sprocket 31, the sleeve 30 and the ratchet gear 32.

In order to impart rotation to the operating shaft 27 and the mechanisms attached to it and dependent upon it, there is provided a ratchet operated clutch, generally designated by the reference character 33. This clutch comprises a disc 34 keyed to the operating shaft 27 and upon the face of the disc adjacent the ratchet gear 32 there is provided a pawl 35 pivotally secured to the disc by means of a pin 36. The pawl has a shoulder 37 on one side of the pivot which is designed to engage the teeth of the ratchet gear. A spring 38 is secured at one end 39 to the pawl on the side of the pivot adjacent the shoulder and at the other end 40 to the disc. The action of the spring normally tends to pull the pawl into position into engagement with the teeth of the ratchet gear.

Projecting from the pawl on the side remote from the operating shaft there is provided a finger 41 having a flat upper face. A lever arm 42 is pivotally mounted at the lower end 43 to the base so that it can move between the dotted line position 42' and the solid line position 42. A spring 44 is anchored at one end to a pin 45 about which the lower end of the lever arm is pivoted and at the other end presses against a boss 46 on the lever arm.

The action of the spring tends normally to urge the lever arm into the solid line position shown in Fig. 3. If desired, a separate bracket 47 may be provided upon the base for supporting the lever arm as described. The bracket may further be provided with an upward extension 48 having an adjusting bolt 49 which can be moved outwardly or inwardly in order to bear against the lever arm when the lever arm is in the solid line position so that the arm may have a proper relationship in that position to the finger 41 on the pawl.

At the top end of the lever arm there is provided an engaging face 50 which is designed to engage the upper face of the finger 41 as shown in Fig. 3. When in this position, the pawl will tend to be rotated in a counterclockwise direction about the pivot pin 36 against the action of the spring 38, thereby tending to withdraw the shoulder 37 out of a position for engagement with the teeth of the ratchet gear. Consequently as the drive continues to operate the ratchet gear through the chain drive it will continue to operate in what may be termed an idling position, ready for, but still out of engagement with, the operating shaft.

In order to prevent reverse rotation of the disc 34, a column 51 pivotally mounted by means of a pin upon a bracket 53 is normally drawn by means of a spring 54 into the solid line position shown in Fig. 3. The spring 54 is anchored at one end 55 to the column and at the other end 56 to a projection 57 supported by the base. At its upper end, the column has an adjusting bolt 59 including a lock nut 60 by means of which it can be set upwardly or downwardly in order to cooperate properly with the pivot pin 36 which, in order to accommodate this function, extends outwardly a substantial distance as can best be seen in the lower portion of Fig. 2.

In order to operate the lever arm 42 there is provided a rod 61 which extends into engagement with a pivotally mounted handle 62. In normal position as previously described, the pawl is held out of engagement with the ratchet gear 32. When it is desired to engage the pawl with the ratchet gear it is necessary only to move the handle 62 in a counterclockwise direction as viewed in Fig. 1. By means of this movement the rod 61 is drawn from right to left to the dotted line position 61' shown in Fig. 3. In this position the lever arm 42 will be out of engagement with the finger 41. The spring will then be free to pull the pawl into the dotted line position 35' where the shoulder 37 will engage the ratchet gear 32. These members thus being engaged, the ratchet gear will rotate the disc 34 through the pawl and ratchet gear connection and since the disc 34 is keyed to the operating shaft, the operating shaft will continued to be driven so long as the pawl remains in engagement. As the disc rotates in a clockwise direction as shown by the dotted arrow in Fig. 3, the pivot pin 36 will rotate around until it reaches a position adjacent the adjusting bolt 59. By reason of the fact that the bolt is held in position by means of the spring 54, it can be pivoted a slight distance counterclockwise in order to permit the extended end of the pivot pin to move past it. As soon as the pivot pin has moved past the adjusting bolt, the bolt will be moved back into the solid line position shown in Fig. 3. Likewise at this point the finger 41 will have moved into engagement with engaging face 50 by reason of the fact that the spring 44 will have meanwhile moved the lever arm 42 clockwise to the solid line position shown in Fig. 3. It will be observed, therefore, that the clutch is a single-revolution clutch, being adapted to be thrown automatically out of engagement at the end of each complete revolution. The only way to permit the clutch to continue in engagement is to manually hold the lever arm out of engagement by means of the handle 62 against the action of the spring 44.

As previously indicated, the fruit, such as a peach 14, is designed to be positioned upon the slide 12 against an empaler 16. Details of this empaler in its initial and extended positions may best be seen in Figs. 1 and 4. The empaler consists of a support 65 mounted upon a shaft 66 which is journaled in a pair of brackets 67 which are in turn mounted upon the base. At its upper end the support is attached to a cross piece 68 by means of a bolt 69. The cross piece, however, is permitted to move pivotally upon the bolt 69 with respect to the support.

It should be noted that the slide 12 has its upper edge 70 curved so that the cross piece occupies a position substantially tangent to the curve when it is disposed horizontally in the initial position as shown in Fig. 1. As the cross piece, which comprises a part of the empaler, is moved along the curved edge of the slide, it becomes advisable to shift the direction of the cross piece so that it will continue to occupy a position substantially tangent to the curve. In order to accomplish this there is provided a parallelogram arrangement by means of which the cross piece is compelled to follow a predetermined path. To facilitate this a parallel support 71 is provided attached at its lower end by means of a link 72 to the support. The link has a pivotal mounting 73 at one end and 74 at the other. The parallel support at its upper end has a pivotal connection 75 to an extension 76 of the cross piece. There is thus provided a parallelogram structure such that as the parallel support 71 may be moved in one direction or another endwise with relation to the support the link 72 and the cross piece 76 will shift in direction but will always remain parallel to each other. A spring 77 is secured at its upper end 78 to the support 65 and at its lower end 79 to the parallel support 71 and tends by its action to normally close the parallelogram so that the parallel support is urged to a position against the support. By this action the cross piece 68 will always be urged in a direction clockwise about the end 73 as a pivot point.

For attaching the fruit to the cross piece comprising the empaler, there is provided a pair of tines 80 extending opposite to each other in a vertical plane and a second pair of tines 81 extending opposite to each other in a horizontal plane. The position of the tines 81 can be changed by reason of the fact that they are provided with an adjustable mounting on the cross piece. The tines 81 include each a shaft 82 which extends along the cross piece to which it is attached by means of adjusting nuts 83. The tines can be moved outwardly toward the right by loosening the nuts 83 and tightening them again against the shaft 82 of the tines in an outwardly extending position. The tines may be extended outwardly or inwardly a distance limited by the length of the shaft 82 attached thereto. The adjustment of the tines thus described is for the purpose of accommodating the machine to fruit having pits of different size. If desired, the adjustment of the pit engaging tines may be limited to this portion of the machine only.

In order to vary the adjustment of the parallelogram as the support 65 moves clockwise so as to advance the empaler, there is provided a curved track 85 designed to confine movement of the empaler to the curve of the top edge 70 of the stationary slide. On the parallel support 71 there is provided a roller 86 which is normally drawn upwardly into contact with the track by reason of the pulling action of the spring 77. The left hand end of the track is curved in a general way to conform to the upper end of the slide, whereas the right hand end of the track indicated by the character 87 is relatively straight corresponding to the right hand end of the straight portion of the slide. As the roller is moved along the track, the parallel support 71 will be moved downwardly against pressure of the spring 77 and will thereby tend to shift the direction of the cross piece 68. That is to say, the angle between the ends of the parallelogram and the adjoining sides will be changed. The track 85 can be given such a direction that the position of the cross piece 68 will be moved so as always to remain tangent to the curved edge 70 of the stationary slide. When the edge of the slide becomes straight, the cross piece can be moved to a position parallel to it by following a similar practice with respect to the shape of the track.

The empaler is driven by action of the operating shaft through a drive connection 88. To accomplish this a sleeve 89 is keyed to the shaft 27 and is provided with a crank arm 90 in the shape of a pivot. The drive connection has a cross head 91 pivotally secured to the crank arm and held thereon by means of a cotter pin 92, thereby supplying an eccentric mounting for the right hand end of the drive connection as viewed in Fig. 2.

Keyed to the shaft 66 is a second crank arm 93 which has a forked upper end 94 and between the arms of the fork is positioned a bushing 95 which is pivotally secured to the crank arm by means of bolts 96.

The left hand end of the drive connection 88 has what may be termed an extension 97 which extends slidably through a bore in the bushing 95. On the extension is provided a locking collar 98 which acts as a spring keeper for a spring 99 which is in a compressed position tending thereby normally to push the extension in a direction from right to left as viewed in Fig. 2. The extent of movement of the extension under action of the spring is limited by a second locking collar 100 which bears against the right hand side of the bushing 95. The tension on the spring and the position of the drive connection 88 can be varied and adjusted by shifting the positions of the locking collars. Set screws 101 and 102 are provided for anchoring the collars in any desired adjusted position.

By means of this spring action at the left hand end of the drive connection as viewed in Fig. 2, the empaler can be set so as to accommodate a pit of the smallest size. If a pit of larger size should be encountered and the empaler limited in its movement from left to right, as viewed in Figs. 1 and 4, the spring 99 will compress, permitting the cross head 91 to rotate through a complete revolution without drawing the support 65 and the crank arm 93 to their most extended positions toward the right. By provision of this automatic spring takeup the danger of breaking or straining the mechanism in case larger pits are encountered is eliminated. A further function of the spring takeup is to prolong the dwell of the empaler at the advance end of the cycle. When the empaler engages the pit it stops while the drive connection continues to be moved forward by the eccentric against the pressure of the spring. On its return the drive connection returns the empaler but not until after it has returned far enough to relieve the spring pressure. The pit is thus held securely for the duration of the dwell while the meat is torn from both sides.

The stationary slide 12 previously referred to has quite generally the shape of a plate section and as best seen in Fig. 1 has an upper portion 105. The upper portion overhangs the right hand end of the upper edge 70 of the slide as viewed in Fig. 1 providing thereby a recess. The overhanging portion has a sharp lower edge 106 and a sharp corner edge 107 designed to cut into a fruit as it is passed into the recess. The inner end of the recess 108 may likewise be provided with sharp edges so as to cut into the end of the fruit as it is driven into the base of the recess. Also at the inner end of the recess there is provided a pair of pit-engaging tines 109, which, for convenience, may be permanently attached to the portion of the stationary slide forming the bottom of the recess. Should it be desired, the end of the upper edge 70 which lies within the recess may be flat rather than sharp in order to provide a support for the sharp edge of a pit or stone when positioned upon the slide.

Figure 4:
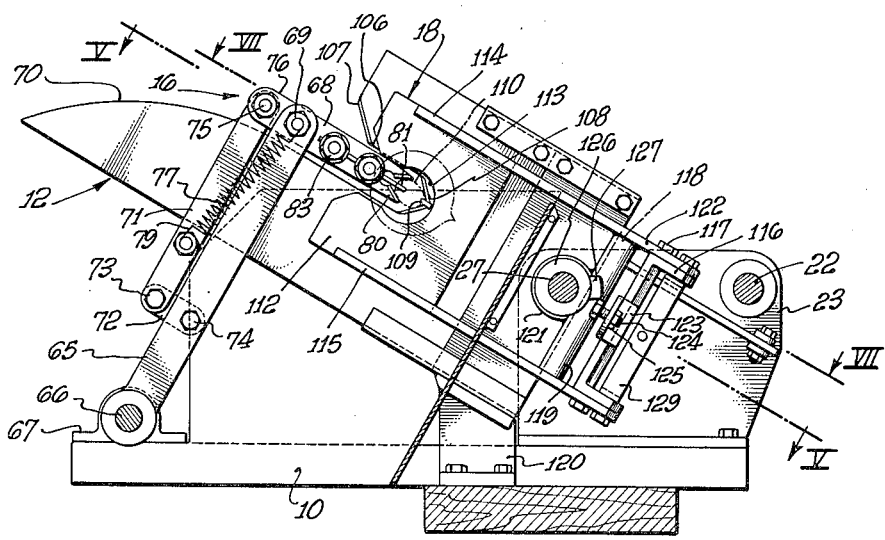
Fig. 4 is a longitudinal, sectional view taken on the line IV—IV of Fig. 2 with the empaler in advanced position.

When the empaler 16 is moved from the initial position shown in Fig. 1 to the extended position shown in Fig. 4, the pit 110 of the fruit will be held between the tines 109 and the tines 81. When the fruit is in this position it is desired to separate the meat on both sides of the pit from the pit itself. To accomplish this there is provided a pair of jaws indicated generally by the character 18 which move from a normally inward position illustrated in Fig. 5 to an outwardly extended position illustrated in Fig. 6.

The jaws 18 consist of a pair of plates each comprising a flat plate 112 provided with a sharp-edged recess 113 corresponding more or less in size and shape to the recess at the adjacent end of the slide. It will be noted, however, that the inner end of the recess 113 may extend slightly further along the slide than the inner end 108 of the recess in the slide. Each plate is provided with a supporting frame consisting of an upper arm 114 and a lower arm 115 attached to the face of the plate remote from the slide. The arms are rigidly connected together by means of a bracket 116 held to the arms by means of bolts 117. The framework thus formed is pivotally mounted upon the base by means of a shaft 118 which extends through a hinged portion 119 of a bracket 120 in turn supported upon the base. The axis of the shaft 118 lies in a plane perpendicular to the axis of the operating shaft 27. If desired the bracket 120 may be extended upwardly so as to provide a central bearing support 121 for the operating shaft. The supporting arms act as a first-class lever about the shaft 118 as a pivot point, each arm having an end 122 bent at a slight angle relative to the portion 114 of the arm which is attached to the flat plate 112.

To move the flat plate outwardly relative to the slide it is necessary to move the opposite end of the supporting arm 122 inwardly. To accomplish this there is provided a lateral extension 123 which has an adjustable cam-engaging button 124 extendig toward the operating shaft 27. This button can be varied in its position by threading it inwardly or outwardly upon an extension and there locking it in position by means of a lock nut 125. A collar 126 is keyed to the shaft and has a cam 127 extending outwardly at one side. The cam extends over a relatively short angular distance with respect to the circumference of the collar so that it engages the button 124 during only a relatively short length of time in one revolution of the operating shaft. At a properly timed interval in the revolution of the operating shaft, the cam 127 presses against the button 124, shifting the extension 123 and likewise the end 122 of the arm which supports the plate 112. This will cause movement of the plate outwardly with respect to the slide for as long as the cam is in contact with the button. As soon as the cam passes beyond its engagement with the button a spring 128 secured between a bracket 129 at each end tends to move the ends 122 of the supporting arms outwardly again and to return the plate 112 on each side to its initial position shown in Fig. 5.

The construction and action of the plates 112 on opposite sides of the slide are complementary and simultaneous and will be readily understood from an examination of the drawings. By the simultaneous action of both plates, opposite halves of the fruit which is to be pitted will be torn from the pit and permitted to fall downwardly and be deflected in a direction so as to fall upon the belt 21 by means of sides 19.

Should it be desired to vary the time for opening the plates 112, the rotative position of the cam 127 on the shaft 27 may be changed and reset to a new position and there secured by means of set screws 130. When the empaler 16 reaches its extended position as shown in Fig. 4, there will be a slight linger in this position while the crank 90 passes from a position at about the end of the advancing stroke to a position at about the start of the return stroke by reason of a slight clearance and tolerance in the fit of the parts. It is during this slight linger that the plates 112 may be timed to move outwardly to best advantage.

The timing of operation of the plates 112 is important. They should separate the flesh from the pit at a time when the pit is firmly retained and after the sharp edges of the recess have cut into the meat or flesh of the fruit. When, as in the invention here involved, all motion is derived from the same operating shaft, the timing problem is simplified and the particular mechanical connection becomes a matter of choice. In the embodiment chosen for illustration, a cam and first-class lever have been shown and described.

After the plates have moved outwardly and returned and after the empaler has begun its return stroke, should the pit remain stuck upon the tines 109 it will be knocked from its position by means of a pit knock-out bar 135. The bar has an end 136 turned inwardly so as to be positioned end on with respect to the side of a pit. The bar is supported upon a pivot arm 137 and can be varied in its angular position relative to the arm by means of a pair of lock nuts 138. The pivot arm, for convenience, is designed to pivot about the shaft 118 upon which the supporting arms of the adjacent plate 112 are pivoted.

For moving the pivotal support there is provided a link 139 which has a pivotal connection 140 at one end in a slot 141 in the pivot arm and a pivotal connection 142 at the other end to a cam-engaging arm 143. The cam-engaging arm is pivotally supported at a point 144 to a bracket 145 mounted upon frame 23. At the opposite or free end of the cam-engaging arm there is a cylindrical cam follower 146 extending downwardly as viewed in Fig. 8. A diagonal wing cam 147 is mounted upon a collar 148 and the collar in turn is adjustably keyed to the operating shaft. During rotation of the shaft a face 149 of the diagonal cam brushes against the cylindrical cam follower 146, moving it and the cam-engaging arm 143 in a counterclockwise direction about the pivot connection 144 as viewed in Fig. 7. Movement of the cam-engaging arm in this direction causes the link 139 to move in a corresponding direction, which in turn moves the pivot arm 137 in a counterclockwise direction about the shaft 118 until the pit knock-out bar 135 occupies the position shown in Fig. 7. In this position the pit-engaging end 136 of the bar will be driven against the side of a pit at rest upon the top of the slide and will knock it laterally as illustrated in Fig. 7 so that it will fall upon the conveyer belt. As soon as the relatively short diagonal cam passes beyond the cam follower, a spring 150 will return the pit knock-out bar and its respective operating parts to the initial position shown in Fig. 2. Meanwhile, the empaler 16 will be returned to its initial position.

Machines of this type will usually be employed in a battery as illustrated in Fig. 9, all operated from the same drive shaft and all served by the same conveyer belt 21, which rolls at one end about a pulley 151. The bin sides 19 of each machine will be directed downwardly toward the conveyer belt. An operator sits behind each machine and in view of the fact that the clutch will be normally disengaged, the operating shaft of any particular machine will remain idle with all of the parts connected thereto at rest. The operator then places a peach or similar drupaceous fruit upon the tines 80 and 81 in the position shown in Fig. 1 and it has been found best to press the fruit upon the sharp upper edge 70 of the slide 12 so that a cut is made along the cleft portion of the fruit. This means that where a fruit has a somewhat oblong pit, such as a peach, the sharp longitudinal edge of the pit will be extended toward the knife. When the peach has thus been empaled, the operator facing the machine from the left hand side, as viewed in Fig. 2, need only permit his right hand to drop against a laterally extending portion 153 of the handle, thereby shifting the handle from right to left in order to disengage the lever arm 42 from the finger 41 of the pawl. This will permit the pawl to engage the ratchet gear and the drive shaft will thereby be immediately connected to the operating shaft and the operating shaft will be rotated. Rotation of the operating shaft through the crank 90 advances the drive connection 88 and hence the empaler 16 until the fruit is driven into the recess at the right hand end of the slide as viewed in Fig. 1. The advanced position is best seen in Fig. 4 which shows the location of the pit with respect to the fruit. The advanced position of the parts is likewise illustrated in Fig. 5.

As the operating shaft continues to operate, the cam 127 will function in order to separate the plates 112, thereby tearing the meat from the pit. After they have returned to their normal position, the crank 90 will begin movement in a reverse direction returning the empaler 15. Meanwhile, by the cam action previously described, the pit knock-out bar will be brought into action and will knock the pit from its position at the end of the slide. The pit knock-out bar will then be returned to its initial position prior to the completion of one revolution of the operating shaft. As the operating shaft completes one revolution, the pawl together with the finger 41 will approach its initial position as shown in Fig. 3. When it reaches that initial position, due to the fact that the spring 44 has returned the lever arm 42 together with the handle to the initial position of those parts, the finger will engage the lever arm and lift the pawl from its engagement with the ratchet gear, thereby disengaging the operating shaft from its drive connection with the drive shaft. All of the parts of the machine will therefore again remain stationary until the operator has again empaled a peach upon the empaler and has again manually connected the clutch.

Figs. 10 through 13 inclusive show a modified form of the device incorporating a pit-receiving member of special construction. In this form of the device there is shown a supporting member 160 for each jaw which is pivotally mounted upon the frame in the same manner as described for the supporting member 114. In this instance, however, there is a stationary center plate 161 which corresponds to the upper portion 105 of the plate section previously described but which extends outwardly only a limited distance, as best illustrated in Fig. 13. The supporting members are bent at 162 so that they approach each other more closely than in the case of the form first described.

In each supporting member there is an upper plate 163 and a lower plate 164. The upper plate has a recessed portion 165 and the lower plate a recessed portion 166 complementary to recessed portion 165 so that together they provide an opening for reception of the pit. The upper plate has a sharp, oblique cutting edge 167 and the lower plate a corresponding cutting edge 168 designed to cut the flesh of the fruit as it is pushed into the opening provided by the recesses. It should be noted also that the plates are provided with relatively large openings 169 to lighten the weight of the plates and also to provide a means for breaking the suction effect of the freshly cut portion of the fruit which extends outwardly beyond the recesses.

By reason of the fact that a stationary slide 170 does not extend in a position between the jaws, a connecting plate 171 is provided in order to attach the stationary slide to the stationary center plate 161. Screws 172 or some similar device may be used for securing the attachment. In this instance the stationary slide has the customary curved, upper knife edge 173 but the upper edge extends only to a position spaced from the forward end of the jaws, leaving a space 174 of substantial breadth between the outwardly extending edge of the jaw and the adjacent edge of the stationary slide. A portion 175 of the slide overlies the oblique knife edge portion 168 of the lower flat plate.

It will be apparent particularly from examination of Fig. 13 that the flat plates 163 and also the plates 164 are designed to be brought into contact with each other in closed position so that when in contact they are in alignment with the stationary slide 170.

In order to make certain that this alignment is maintained, there are provided adjusting screws 176 which extend threadably into a bracket 178 on the supporting members on each side to a position wherein they engage the stationary center plate. Lock nuts 177 are provided in order to lock each adjusting screw in its proper position.

The pit-receiving member comprises a cylindrical element 180 which is stationarily mounted upon the stationary center plate 161. It will be apparent that the flat plates 163 and 164 are positioned so that they are separated by a space 181 adjacent the inner end of the recessed portions in order to accommodate the pit-receiving member. A plunger 182 has a hollow sleeve portion 183 slidably mounted within the cylindrical element and an outwardly extending end comprising upper and lower tines 184 which are adapted to engage the fruit. The cylindrical element may be provided with a slot 185 adapted to receive a pin 186 projecting into it from the sleeve of the plunger so as to limit the extent of relative movement between the parts. Within the sleeve and the cylindrical element there is positioned a coiled, expanding spring 187 which normally urges the plunger in an outward direction identified by the solid line 184 in Fig. 10.

In addition to the tines 184 there are provided adjustable prongs 188, one lying on each side of the cylindrical element. For holding the prongs there is provided for each a boss 190 extending outwardly from the side of the cylindrical element which is provided with an aperture 191 through which one end of the prong is extended. A screw 192 is threadably received within the boss and can be screwed down tight against the prong positioned therein in order to anchor it in place. The prong 188 in each case lies substantially flat against the side of the cylindrical element and at the side of the plunger which is tapered toward its outer end whereon the tines 184 are fixed. At the base of the tines there is an elongated slot 193 adapted to receive both of the prongs. The prong from one side extends through the slot so that its end 194 projects a slight distance beyond the opposite side from which it enters and the prong on the contrary side extends through the slot 193 crossing the first prong so that it extends a slight distance beyond the plunger on the side opposite from which it enters the slot. In normal or extended position of the plunger the ends 194 are relatively withdrawn to a position wherein they extend only a slight amount in a laterally withdrawn direction. When the plunger is pressed inwardly, as for example when the pit of a fruit is forced against it, the plunger slides into the cylinder and the prongs, being affixed to the cylinder, are slit outwardly relative to the slots through which they pass and when the plunger is in depressed position the prongs are bowed outwardly so that the ends 194 project a substantial distance beyond the end of the plunger, as illustrated in Fig. 12.

In using the modified form of the device a fruit is empaled upon some suitable member such as that described in connection with the preferred embodiment and is forced along the slide in the usual way until it is pushed against the sharp edges 107 and 108 of the jaw plates. At this point the fruit leaves the slide and enters the recessed portions of the plates. As the fruit enters, the flesh is cut to a depth approximately flush with the pit. At this point the pit-receiving member is in the extended position 184. As the fruit is continued to be pressed into the recessed portions, the pit is driven against the V formed between the tines 184. Then as the pressure is continued, the tines, together with the plunger 182, are forced from left to right as viewed in Figs. 10 and 12 until the tines are backed against the adjacent edges of the recessed portions. During this movement the prongs 188 remain in fixed location but are bowed outwardly and project into the fruit as the fruit is advanced during this last portion of its movement into the recessed portions. By thus projecting the prongs endwise into the fruit the flesh of the fruit is not torn. The prongs pierce the flesh and then lie adjacent the side surfaces of the pit where they provide an additional support for retaining the pit while the jaw elements are moved laterally outwardly in the usual way to tear the flesh from the pit on both sides.

After the flesh has been torn away, a pit knockout bar of the type described in the preferred embodiment operates to knock the pit from its position in the recess after which all of the parts are returned to their initial position. In the initial position the tines on the plunger will again extend outwardly to the position 184 and the prongs will again be withdrawn so that the ends 194 are snug against the end of the plunger. If preferred, the fruit-receiving member just described may be provided with a sufficient movement endwise so as to compensate for pits of different sizes and thereby permit a simpler construction of the fruit empaler which is designed to force the fruit along the slide into a position between the jaws.

In the invention thus described there has been provided a pitter for freestone, drupaceous fruits which is capable of operation by a single operator and which, because of coming to a stop at the end of each complete pitting operation, is always at rest and waiting to receive a fruit for the next operation. The machine is one wherein the mechanical construction for each movement is rugged and simple. Moving parts, however, have been compactly arranged so that the pitter as a unit can be placed with many others of the same type in a battery for handling a large volume of fruit. The operator can combine the hand motion required to empale the fruit with the motion needed to start the mechanism and thereby greatly promote the efficiency of an operator to pit fruit by use of the machine.

I claim:

1. A fruit pitting machine including a support, a power shaft, a stationary slide, said slide having a knife edge, the said knife edge having an elongated curved upwardly extended cutting edge and a relatively short opposed cutting edge spaced from the first said cutting edge, a curved cutting edge connecting the said cutting edges and forming a recess in said slide, an impaler for moving a fruit along said slide and into said recess, power means for moving said impaler along said slide, a pair of plates pivotally mounted on said support and positioned on each side of said slide, each of said plates having a recess therein corresponding to the recess in said slide; power means for moving said plates about their pivot point to cause the recesses in said plates to simultaneously separate from the recess in said slide; spring means for returning the said plates to their initial position, a bar having a free end and its other end pivotally mounted on said frame adjacent one of the said plates, the said free end having an inwardly turned portion extendable into the said recesses but normally spring held laterally from said recesses, and power means for moving said bar about its pivot point and extending the said inward turned portion of the said free end into the said recesses.

2. A fruit pitting machine in accordance with claim 1 wherein the power means for moving said impaler along said slide include a rotatable power shaft, the said power shaft having a pair of cam members thereon for sequentially operating the power means for moving said plates and the power means for moving said pivotally mounted bar during each revolution of said power shaft.

3. A fruit pitting machine adapted to pit freestone peaches and the like, comprising stationary pitting means including a longitudinally extended blade having a knife edge and a socketed blade having a concave knife edge disposed in the plane of and at one end of said longitudinal blade; an impaling element supported for movement adjacent and parallel to said longitudinal knife edge; spreader plates disposed on opposite sides of and adjacent to said socketed blade; means pivotally supporting said spreader plates for spreading apart and for closing; and means for actuating said impaler element and spreader plates in timed relationship so as to spread said plates when said impaling element has lodged a fruit in said socketed blade.

4. A fruit pitting machine adapted to pit freestone peaches and the like, comprising stationary pitting means including a longitudinal blade having a knife edge disposed in a vertical plane and a socketed blade having a concave knife edge dispised in the plane of said longitudinal blade; an impaling element supported for pivotal movement adjacent and parallel to said longitudinal knife edge; spreader plates disposed on opposite sides of and adjacent to said socketed blade; means pivotally supporting said spreader plates for spreading apart and for closing; and means for pivoting said impaling element and for spreading and closing said blades in timed relationship so as to spread said plates when said impaling element has lodged a fruit in said socketed blade.

5. A fruit pitting machine adapted to pit freestone peaches and the like, comprising stationary pitting means including a longitudinal blade having a knife edge disposed in a vertical plane and a socketed blade having a concave knife, said longitudinal blade being disposed in a vertical plane and its knife edge having an upper arcuate portion and a lower linear portion, said concave knife edge being disposed in the plane of said longitudinal knife edge; an impaling element supported for pivotal movement adjacent and parallel to said longitudinal knife edge; spreader plates disposed on opposite sides of and adjacent to said socketed blade; means pivotally supporting said spreader plates for spreading apart and for closing; and means for actuating said impaling element and said spreader plates in timed relationship so as to spread said spreader plates when said impaling element has lodged a fruit in said socketed blade, and for returning said spreader plates to closed position thereafter.

6. A fruit pitting machine adapted to pit freestone peaches and the like, comprising a rotatable shaft; stationary pitting means including a vertical blade having an arcuate knife edge and a socketed blade having a knife edge disposed in the plane of said arcuate knife edge; an impaling element supported for pivotal movement adjacent and parallel to said arcuate knife edge; spreader plates disposed on opposite sides of and adjacent to said socketed blade; means supporting said spreader plates for pivotal movement to spread the same from said socketed blade and to close the same; means operatively connecting said shaft with said impaling element to oscillate the same; and means, including cams disposed on said shaft, for pivoting said spreader plates in timed relationship to said impaling element to spread said plates when said impaling element has lodged a fruit in said socketed blade.

7. A fruit pitting machine adapted to pit freestone peaches and the like, comprising a rotatable shaft; stationary pitting means including a vertical blade having an arcuate knife edge; a socketed blade having a concave knife edge disposed at the lower end of and in the plane of said arcuate knife edge; an impaling element supported for pivotal movement adjacent and parallel to said knife edge; spreader plates disposed on opposite sides of said socketed blade; means supporting said spreader plates for pivotal movement to spread and close the same; means including cams secured to said shaft for pivoting said spreader plates; and means operatively connecting said shaft with said impaling element, including a rod connected at one end to said shaft and connected at its other end to said supporting member by resilient means allowing maximum travel of said impaling element when a small pit is lodged in said socketed blade and a lesser than maximum travel thereof when a large pit is lodged in said socketed blade and obstructs further travel of said impaling element.

8. A fruit pitting machine comprising stationary pitting means including a longitudinal blade and a socketed blade at one end thereof; an impaling element; means supporting said impaling element for oscillatory movement along and adjacent to said longitudinal blade between a retracted position removed from said socketed blade and an advanced position adjacent said socketed blade; a rotatable shaft; and means operatively connecting said shaft and supporting means to oscillate said impaling element, said means including a rod, a crank connecting one end thereof to said shaft and resilient means connecting the other end of said rod with said supporting means, whereby said impaling element may undergo less than maximum travel when its path is obstructed by a large pit in said socketed blade.

LAURENCE W. WATERS.

REFERENCES CITED

The following references are of record in the file of this patent:

UNITED STATES PATENTS

| Number | Name | Date |
|---|---|---|
| 482,272 | Philips | Sept. 6, 1892 |
| 737,615 | Harpold | Sept. 1, 1903 |
| 808,464 | Lynn | Dec. 26, 1905 |
| 921,523 | Dunkley | May 11, 1909 |
| 1,256,439 | Clark | Feb. 12, 1918 |
| 1,263,742 | Chase | Apr. 23, 1918 |
| 1,334,449 | Griffin | Mar. 23, 1920 |
| 1,488,082 | Wilcox | Mar. 25, 1924 |
| 1,512,410 | Eldridge | Oct. 21, 1924 |
| 1,786,724 | Wilcox | Dec. 30, 1930 |
| 1,834,082 | Ballard et al. | Dec. 1, 1931 |
| 1,919,651 | Helsel | July 25, 1933 |
| 2,026,806 | Thompson | Jan. 7, 1936 |
| 2,066,567 | Jepson | Jan. 5, 1937 |
| 2,313,898 | Silva | Mar. 16, 1943 |